A. P. PHILLIPS.
FOOT MEASURING DEVICE.
APPLICATION FILED DEC. 5, 1907.
902,167.
Patented Oct. 27, 1908.
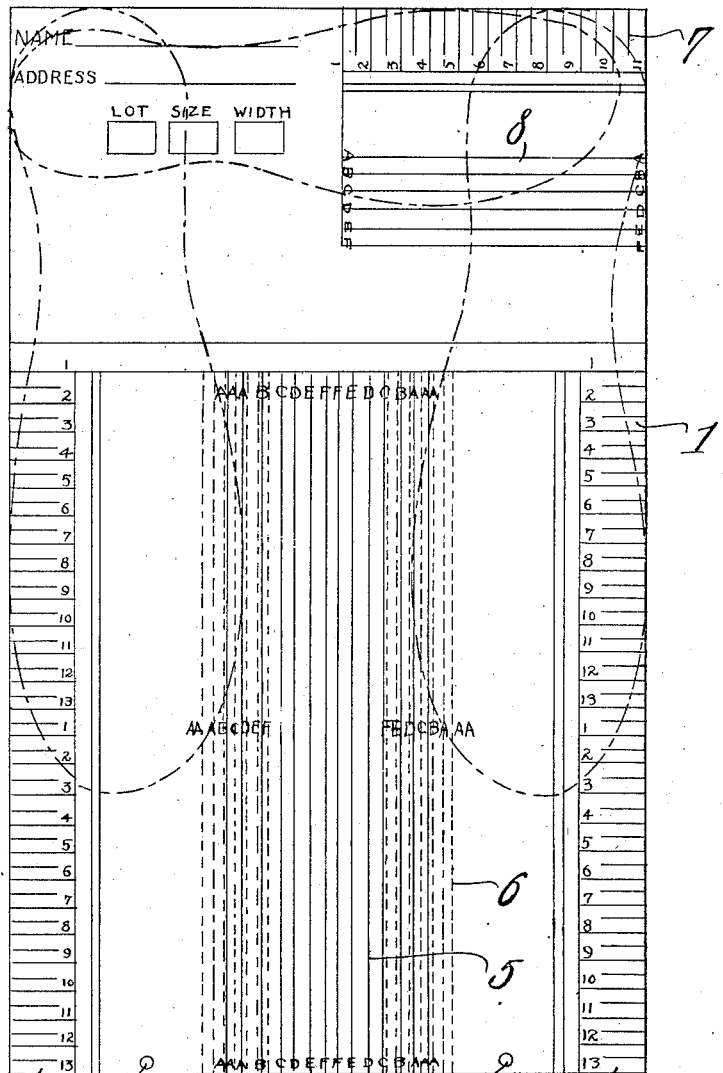
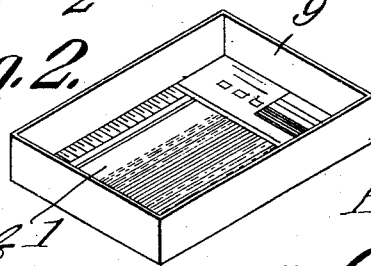
Witnesses:
Inventor,
Austave P. Phillips.
By C. A. Snow & Co
Attorneys.

# UNITED STATES PATENT OFFICE.

AUSTAVE PAUL PHILLIPS, OF ATLANTA, GEORGIA.

FOOT-MEASURING DEVICE.

No. 902,167. Specification of Letters Patent. Patented Oct. 27, 1908.

Application filed December 5, 1907. Serial No. 405,224.

*To all whom it may concern:*

Be it known that I, AUSTAVE PAUL PHILLIPS, a citizen of the United States, residing at Atlanta, in the county of Fulton and State of Georgia, have invented a new and useful Foot-Measuring Device, of which the following is a specification.

This invention relates generally to foot measuring devices, and particularly to one adapted for use by shoe merchants.

The object of the invention is to provide a device of this character which shall be simple and cheap in construction, easy of employment, and which will not only accurately give the necessary length and width of shoes, either of men, women or children, but will also enable the user to ascertain the character of last required, that is to say, whether it should be curved or straight on its outer side.

With the above and other objects in view, as will appear as the nature of the invention is better understood, the same consists in the novel form of foot measuring device hereinafter fully described and claimed.

In the accompanying drawing, forming a part of this specification, and in which like characters of reference indicate corresponding parts, Figure 1 is a plan view of the measuring device or chart constituting the subject matter of the present invention. Fig. 2 is a perspective view, on a reduced scale, showing the manner in which the chart is employed.

The chart or record 1 is constructed from a sheet of paper of any desired size, and may be provided with orifices 2 to facilitate filing away for future reference. It is designed that a number of these charts or records shall be assembled in tablet form, and in use that a copy shall be made of each record by the use of carbon paper, the original being retained by the merchant and the copy being given to the customer.

Disposed along the two longitudinal edges of the chart or sheet are two length scales 3 and 4 which extend throughout approximately two thirds of the length of the sheet and are divided into spaces representing inches and fractional parts thereof, and numbered in duplex order from 1 to 13. Arranged between the two scales 3 and 4 are width scales for measuring the feet of men and women, those used for the man being indicated by straight solid lines 5, and those for the women by straight dotted lines 6. The value of these lines are indicated by letters such as are employed by all standard shoe manufacturers in designating widths, namely: AA, A, B, C, D, E, and F. In order to avoid confusion, those indices above enumerated for indicating children's shoes are located approximately in alinement with the inner ends of the scales 3 and 4, those for women at intermediate portions of the said scales, and those for men at the outer ends of the scales.

At one end of the sheet, and extending transversely thereof, there is provided scales for measuring the lengths and widths of a child's right foot up to size 11, and in widths from A to F. The length scale is designated 7 and the width scale 8. That portion of the sheet upon which the last-named scale is arranged will be provided with a suitable field to receive the name and address of the customer, and the lot, size and width of the shoe.

The spaces between the length and width scales will be utilized for receiving the advertisement of the merchant employing the chart.

In order to facilitate accurate use of the chart, there is a box 9 employed, which is of a width to receive either a single sheet, or a plurality of the sheets in tablet form, this box being of any desired depth as may be best adapted to the use for which it is designed.

In ascertaining the length, width, and shape of the feet of, say, a woman, she will first place her right foot in the box, the chart having been previously arranged therein, with the heel pressing against the back of the box and the joint of the great toe against the side thereof. The attendant will then draw a line around the outer side of the foot, beginning with the center of the great toe and extending to the heel, and in this instance it will show that the length of the shoe is number 3, its width D, and that it will require a curved last. The same procedure is observed with the left foot, the only difference being that the record will be placed on the opposite portion of the sheet. The same procedure holds good with reference to taking measurement of men's feet.

It will be seen from the foregoing description, that, by the use of this chart, accurate measurements, both of the length and width of the feet, may be secured, as well as a proper determination of the character of last that should be employed.

The invention will be peculiarly advantageous for use in rural districts where persons are compelled, very often, to send to a distance for their foot wear.

I claim:—

The combination with a box, of a series of charts arranged loosely therein, each having disposed transversely of one end a foot width and a foot length scale, longitudinally of the two edges foot length scales divided into inches and fractional parts thereof, and intermediate of its width longitudinally-disposed foot width scales indicated by solid and broken straight lines each having associated with it a suitable legend, the solid lines being used to determine the width of a man's feet and the broken lines the width of a woman's feet.

In testimony that I claim the foregoing as my own, I have hereto affixed my signature in the presence of two witnesses.

AUSTAVE PAUL PHILLIPS.

Witnesses:
   E. W. BORN,
   WAVERLEY FAIRMAN.